(12) United States Patent
Cheek et al.

(10) Patent No.: US 7,662,030 B2
(45) Date of Patent: Feb. 16, 2010

(54) METHOD FOR HUMANELY STUNNING AND SLAUGHTERING POULTRY USING CONTROLLED LOW ATMOSPHERIC PRESSURE

(76) Inventors: Hollis Cheek, P.O. Box 1138, Kosciusko, MS (US) 39090; Bruno Cattaruzzi, 34-25010 S. Zeno Naviglio, Brescia (IT)

( * ) Notice: Subject to any disclaimer, the term of this patent is extended or adjusted under 35 U.S.C. 154(b) by 63 days.

(21) Appl. No.: 11/935,219

(22) Filed: Nov. 5, 2007

(65) Prior Publication Data

US 2009/0117839 A1    May 7, 2009

(51) Int. Cl.
*A22B 3/00* (2006.01)
(52) U.S. Cl. ....................... 452/57
(58) Field of Classification Search ............. 452/57, 452/66, 54, 67
See application file for complete search history.

(56) References Cited

U.S. PATENT DOCUMENTS

| | | | | |
|---|---|---|---|---|
| 2,588,770 | A * | 3/1952 | Sadler | 600/21 |
| 3,548,447 | A * | 12/1970 | Price, Jr. | 452/52 |
| 4,829,635 | A * | 5/1989 | Tonnies | 452/57 |
| 5,104,352 | A * | 4/1992 | Dransfield | 452/198 |
| 5,653,629 | A * | 8/1997 | Audsley et al. | 452/66 |
| 6,174,228 | B1 | 1/2001 | Grimsland et al. | |
| 2003/0154976 | A1 | 8/2003 | Dagletty et al. | |
| 2006/0009142 | A1 | 1/2006 | Cattaruzzi | |

FOREIGN PATENT DOCUMENTS

| | | |
|---|---|---|
| DE | 8701791 | 6/1988 |
| DE | 8701971.1 | 6/1988 |
| EP | 1609365 A2 | 12/2005 |
| JP | 07203837 | 8/1995 |

OTHER PUBLICATIONS

Purswell, et al., "Identifying Process Variables for a Low Atmospheric Pressure Stunning-Killing System," J. Appl. Poult. Res., 2007, vol. 16, pp. 509-513.
Italian Office Action regarding Application Serial No. 08150478.9, 2 pages.
AVMA, 2000. Report of the AVMA Panel on Euthanasia, http://www.avma.org/issues/animal-welfare/euthanasia.pdf, JAVMA, vol. 218, No. 5, Mar. 1, 2001, pp. 669-690.
Burton, R. B. et al., "Acute hypoxia tolerance of the chick," Poultry Science, 1969, vol. 48, pp. 1265-1269.
Dawson, W.R. et al., "Regulation of body temperature," Sturkie's Avian Physiology, 2000, pp. 344-379, G.C. Whittow (ed.), Academic Press, London.

(Continued)

*Primary Examiner*—Thomas Price
(74) *Attorney, Agent, or Firm*—Armstrong Teasdale, LLP (57) ABSTRACT

The present disclosure generally relates to a method for humanely stunning and slaughtering poultry, and more particularly to a method for stunning and slaughtering poultry using a low atmospheric pressure system. In particular, the birds are placed into a sealed chamber and the pressure in the chamber is reduced at a continuous rate to a target decompression pressure and maintained at the decompression pressure for a period of time until a state of death is obtained. The low atmospheric pressure slaughter is more humane than traditional slaughter techniques and results in excellent meat quality.

23 Claims, 1 Drawing Sheet

OTHER PUBLICATIONS

Dell, P. et al., "Effects of hypoxia on the reticular an dcortical diffuse systems," Cerebral Anoxia and the Encephalogram, 1961, pp. 46-58, (H. Gastart and J.S. Mayer (eds)), Charles C. Thomas, Springfield, IL.

Ernsting, J., "The effect of anoxia on the central nervous system," A Texbook of Aviation Physiology, J.A. Gillies (ed.), 1965, pp. 270-289, Pergamon Press, London.

European Union Directive 93/119 EC, Annex C, III., Pt. 4, Dec. 22, 1993.

Fedde, M. R., "Relationship of structure and function of the avian respiratory system to disease susceptibility," Poultry Science, 1998, vol. 77, pp. 1130-1138.

Guyton, A.C. et al., Textbook of Medical Physiology (10 ed.), 2000, p. 714, W.B. Saunders Co., Philadelphia.

Hudson, R. J., et al., "Basic Principles of Clinical Pharmacology," Clinical Anesthesia (5th ed.), 2006, pp. 247-274, P.G. Barash, B.F. Cullen and R.K. Stoelting (eds.), Lippincott, Williams and Wilkins, Philadelphia.

Lange, K.E., et al., "Advance Life Support Program, Requirements, Definition and Design Considerations", 1998, JSC-38571, NASA, Johnson Space Center, Houston.

Raj, A.B.M., et al., "Effect of rate of induction of carbon dioxide anesthesia on the time of onset of unconsciousness and convulsions," Res. Vet. Sci., 1990, vol. 49, pp. 360-363.

Raj, et al., "Changes in the somatosensory evoked potentials and spontaneous electroencephalogram of broiler chickens during exposure to gas mixtures," Br. Poult. Sci., 1998, vol. 39, pp. 686-695.

Raj, et al., "Changes in the somatosensory evoked potentials and spontaneous electroencephalogram of hens during stunning in argon-induced anoxia," 1992, Br. Vet. J., vol. 147, pp. 322-330.

Thaxton, J.P., et al., "Corticosterone in Commercial Broilers," J. Appl. Poult. Sci., 2005, vol. 14, pp. 745-749.

Wolley, S.C., et al., "Physiology and behavioural responses of the domestic hen to hypoxia," Res. Vet. Sci., 1988, vol. 45, pp. 377-382.

International Search Report and Written Opinion from PCT/US2008/082362, dated May 1, 2009.

* cited by examiner

METHOD FOR HUMANELY STUNNING AND SLAUGHTERING POULTRY USING CONTROLLED LOW ATMOSPHERIC PRESSURE

BACKGROUND OF THE DISCLOSURE

The present disclosure generally relates to a method for humanely stunning and slaughtering poultry, and more particularly to a method for stunning and slaughtering poultry using a low atmospheric pressure system. In particular, the birds are placed into a sealed chamber and the pressure in the chamber is reduced at a continuous rate to a target decompression pressure and maintained at the decompression pressure for a period of time until the poultry achieves a state of death. The low atmospheric pressure slaughter is more humane than traditional slaughter techniques and results in excellent meat quality.

In the poultry-processing industry, poultry such as hens, chickens, turkeys and the like, is processed in slaughterhouses into products intended for human consumption. Before the birds can be processed, they must first be stunned and then killed. The stunning of the birds may be achieved, for example, by exposing the birds briefly to an electric voltage or by placing the poultry in a room containing a stun gas. The stunning, either by means of an electric voltage or in some other manner, renders the birds unconscious or semi-conscious, so that the birds will not struggle to free themselves during further processing and will not be conscious at the time of death. Once stunned, the poultry is typically slaughtered by cutting the neck, so that the poultry will bleed to death. Alternately, the poultry may be re-exposed to an electric voltage, and electrocuted.

At present, most birds are stunned by electrical shock. This method is generally reliable and safe. However, prior to stunning, the birds' legs are placed in shackles forcing them to remain in an upside-down position as they are stunned. This position raises the blood corticosterone, a hormone integral to the general well being of birds, indicating increased stress levels. Furthermore, the birds may struggle prior to being shocked, which can result in broken wings and other damage to the poultry, thereby reducing the value of meat obtained from the poultry, and also increasing the extent of suffering of the birds.

Gas stunning typically involves the introduction of gasses such as carbon dioxide plus other gases, including argon, nitrogen, and oxygen into a closed chamber. However, use of these gases may be dangerous to humans, can require excessively long exposure times, and often results in grand mal seizures in the birds, suggestive of extreme pain. In addition, in the event of plant shutdown during the gas stunning process, the birds in the chamber cannot be removed until the gases are safely exhausted, and any birds that are not yet dead may revive and will suffer greater stress.

Attempts have also been made to stun or slaughter animals using changes in pressure. For example, U.S. Pat. No. 4,829,635 to Tonnies discloses a method for stunning animals such as pigs before slaughter. The animal is enclosed in a chamber that is first evacuated to an intermediate pressure that is well below atmospheric pressure, until the animal loses consciousness but not reflexes. The chamber is then evacuated again to a low pressure well below the intermediate pressure, and the low pressure is maintained until the animal is without reflexes, but heart function remains.

U.S. Pat. No. 2,588,770 to Sadler discloses an apparatus and method for stunning or killing animals. The process involves a two step pressure drop, first to a pressure low enough to cause sleepiness or unconsciousness, and then to a lower air pressure which is sufficient to kill.

However, none of the methods used in the prior art take into consideration the animal's behavior, physiology, or hormonal characteristics, or the effects of particular pressure levels and time of pressure decrease on the humanity of the stun/slaughter process or the effects of these variables on meat quality. There is thus a need for a more humane method of stunning and slaughtering animals, and in particular poultry, that also results in an excellent meat quality.

SUMMARY OF THE DISCLOSURE

The present disclosure generally relates to a method for humanely stunning and slaughtering poultry, and more particularly to a method for stunning and slaughtering poultry using a low atmospheric pressure system. In particular, the birds are placed into a sealed chamber and the pressure in the chamber is reduced at a continuous rate to a target decompression pressure and maintained at the decompression pressure until a state of death is obtained. The low atmospheric pressure slaughter described herein is more humane than traditional slaughter techniques, and results in excellent meat quality.

Thus, in one aspect, the present disclosure is directed to a method for humanely stunning and slaughtering poultry. The method comprises enclosing the poultry in a sealed chamber; decompressing the chamber at a continuous rate to a decompression pressure, the decompression pressure being lower than a normal atmospheric pressure at which the poultry is accustomed to living; and maintaining the decompression pressure until the poultry achieves a state of death. Advantageously, about 90% or more of the brain wave activity of the poultry ceases prior to the poultry experiencing heart fibrillation.

In another aspect, the present disclosure is directed to a method for humanely stunning and slaughtering poultry. The method comprises enclosing the poultry in a sealed chamber; decompressing the chamber at a continuous rate to a decompression pressure of from about 21 inHg gauge to about 27 inHg gauge as measured at mean sea level over a lapse time of from about 30 seconds to about 120 seconds; and maintaining the decompression pressure for from about 15 seconds to about 60 seconds.

Other objects and features of this invention will be in part apparent and in part pointed out hereinafter.

DETAILED DESCRIPTION OF THE DISCLOSURE

The present disclosure generally relates to a method for humanely stunning and slaughtering poultry, and more particularly to a method for stunning and slaughtering poultry using a low atmospheric pressure system. In particular, the birds are placed into a sealed chamber and the pressure in the chamber is reduced at a continuous rate to a target decompression pressure and maintained at the decompression pressure until a state of death is obtained. The low atmospheric pressure slaughter described herein is more humane than traditional slaughter techniques, and results in excellent meat quality.

It has now been discovered that poultry may be stunned and slaughtered using a low atmospheric pressure system (LAPS). The system described herein is more humane than prior known stunning/slaughter techniques, such as electrical stunning followed by exsanguination, gas stun/slaughter, or previously attempted pressure slaughter methods.

In particular, the method comprises enclosing the poultry in a sealed chamber, decompressing the chamber at a continuous rate to a decompression pressure that is lower than the normal atmospheric pressure at which the poultry is accustomed to living, and maintaining the decompression pressure until the poultry achieves a state of death. Advantageously, this method results in the birds experiencing about a 90% or more reduction in brain wave activity prior to heart fibrillation, ataxia, and death. As a result, the birds are rendered unconscious and, unlike other traditional stun/slaughter techniques, are unaware of impending death. Consequently, the birds experience less stress and struggling during the slaughter process. Additionally, the low atmospheric pressure methods described herein are a rapid and efficient means for stunning/slaughtering poultry. In particular, the poultry typically achieve a state of death within about three minutes or less after being enclosed in the sealed chamber.

More particularly, decompression creates a vacuum in the sealed chamber, which forces oxygen out of the birds' lungs, simultaneously crushing both lungs. At the onset of unconsciousness, the birds experience ataxia, i.e., loss of posture (LOP), resulting in the birds being unable to maintain a standing position, and having no neck tension. Upon ataxia, the birds exhibit a tonic seizure, with wings extended and the tips of the wings crossed on the distal extremities. Because the birds have been rendered unconscious (i.e., about 90% or more of the brain wave activity of the bird has ceased) prior to ataxia, the birds are unaware of their impending death and do not suffer during the seizures.

Without wishing to be bound by any particular theory, it is believed that during ataxia, cells obtain their energy through the process of anaerobic metabolism. Because neurons have only a minimal reserve of glycogen, the brain itself is not capable of much anaerobic metabolism. Furthermore, the metabolic rate of neurons is much higher than other tissues and, as a result, glucose is continuously being metabolized and storage simply does not occur. Additionally, storage of oxygen in neurons is very minimal. Thus, most neuronal activity depends on second-to-second delivery of glucose and oxygen from the blood. The sudden cessation of blood flow to the brain or sudden rapid decrease in oxygen in the blood resulting from the vacuum created upon decompression results in unconsciousness in the birds.

As noted above, prior to decompression, the birds are enclosed in a sealed chamber. Any suitable decompression chamber known in the art or commercially available may be used to perform the methods described herein, such as those described in U.S. Pat. Nos. 2,588,770 and 3,548,447, herein incorporated by reference in their entirety. One example of a suitable decompression chamber is described in the Test Methods section of the Examples. In one particular aspect, a suitable chamber is the chamber described in U.S. Patent Application Publication No. 2006/0009142 A1, herein incorporated by reference in its entirety.

The target decompression pressure needed to achieve a humane stun/slaughter may vary depending on a variety of factors, such as type of poultry, the time it takes to reach the decompression pressure (referred to herein as "lapse time"), the length of time the decompression pressure is maintained (referred to herein as "hold time"), and altitude at which the stun/slaughter occurs. Typically, however, the decompression pressure will be from about 21 inHg to about 27 inHg, more typically from about 24 inHg to about 25 inHg, and more typically will be about 25 inHg.

It should be understood that unless otherwise indicated, pressure values are given herein in inches of mercury (inHg) gauge pressure under vacuum. Thus 25 inHg, as referred to herein, would be an absolute pressure of about 4.92 inHg (assuming atmospheric pressure of 29.92 inHg), or about 16.599 kPa absolute pressure. Additionally, for purposes of the present disclosure, pressure values given herein refer to pressures as measured at mean sea level. It is to be understood, however, that pressures may vary slightly depending on the altitude at which they are measured. As such, it is intended for the pressures given herein to encompass corresponding pressures as measured at different altitudes.

Alternately, the degree of decompression can be expressed as a percent of the atmospheric pressure at which the poultry normally live present in the decompression chamber following decompression. For instance, if the atmospheric pressure is 29.92 inHg, a decompression pressure of 25 inHg gauge would be 16.44% of atmospheric. Preferably, the decompression pressure is from about 10% to about 30% of atmospheric, and more preferably is from about 16% to about 20% atmospheric.

Preferably, the pressure in the chamber is lowered at a continuous rate to the decompression pressure. As used herein, "continuous rate" means the rate of pressure drop is generally and substantially uninterrupted and steady; that is, the rate of pressure drop is generally a straight line pressure draw down without significant individual pressure stages.

In addition to decompression pressure, the time it takes to reach the desired decompression pressure (i.e., the lapse time) may affect the quality of the slaughter. For instance, quick decompressions (i.e., short lapse times) may result in some birds reviving prior to death, while slower decompressions (i.e., long lapse times) may result in more wing flapping, wing damage, longer periods of consciousness, and more awareness of the environment and pain prior to death. Typically, however, the lapse time is from about 30 seconds to about 120 seconds, more preferably from about 50 seconds to about 75 seconds, and more preferably is about 60 seconds.

It should be recognized that the lapse times provided herein are for stun/slaughters performed at mean sea level. However, lapse time may vary depending on the altitude at which the slaughter is being performed. For instance, the time it takes to reach the target decompression pressure will be somewhat shorter with increase in altitude. In general, the altitude adjustment for lapse time may be calculated by subtracting one second from the lapse time for each one thousand feet increase in altitude.

Once the target decompression pressure is reached, the decompression pressure is preferably maintained for a period of time (i.e., the hold time) until the poultry achieve a state of death. As used herein, the term "state of death" is intended to refer to the point at which all vital signs of the poultry cease, and there is a lack of response to stimuli that produce predictable responses. By maintaining the decompression pressure for a period of time, the meat quality of the slaughtered birds may be improved. Without wishing to be bound to any particular theory, it is believed that by maintaining the decompression pressure for a period of time, the oxygen concentration in the tissues and blood of the birds is reduced. As a result, the tissue pH becomes stabilized, and many of the metabolic events that typically occur during the post-mortem period are eliminated and/or reduced. Consequently, the color, moisture, and tenderness of the meat obtained from the slaughtered birds is excellent and may have advantages over meat obtained through other slaughter techniques that subject the birds to stressful environments.

Preferably, the hold time is at least about 15 seconds, more preferably is from about 15 seconds to about 60 seconds, and more preferably is about 30 seconds. Hold times of greater than 60 seconds may be used and are within the scope of the present disclosure, but are not required to achieve a humane stun/slaughter producing good meat quality. Additionally, although hold times of less than 15 seconds are generally not preferred, they are within the scope of the present disclosure.

As noted above, the low atmospheric pressure system described herein advantageously results in a more humane slaughter as compared to currently available slaughter methods, such as electrical stunning followed by exsanguination and gas stunning/slaughter. In particular, the pressure decrease renders the birds unconscious prior to heart fibrillation and occurrence of ataxia. It has been previously demonstrated that on average, a flat line electroencephalogram (EEG) occurs at about a 90% reduction in signal, and that at this point, consciousness has been lost. See, Raj, et al., "Changes in the somatosensory evoked potentials and spontaneous electroencephalogram of broiler chickens during exposure to gas mixtures," Br. Poult. Sci., 1998, Vol. 39, pp. 686-695 and Raj, et al., "Changes in the somatosensory evoked potentials and spontaneous electroencephalogram of hens during stunning in argon-induced anoxia," 1992, Br. Vet. J., Vol. 147, pp. 322-330. Thus, subsequent to the point at which about 90% or more of the brain wave activity of the poultry ceases, the birds are unconscious and not aware of physiological stress or environment, and thus do not recognize impending death.

Typically, cessation of about 90% or more brain wave activity is achieved after decompression to a pressure of from about 18 inHg to about 22 inHg, and more typically to about 20 inHg. Typically, these pressures are reached after about 20 seconds to about 50 seconds of decompression, more typically after about 31 seconds to about 33 seconds of decompression, and more typically after about 32 seconds of decompression. It should be understood that the time following the start of decompression that it takes to reach a 90% or more loss of brain wave activity may vary depending on the target decompression pressure and/or lapse time. For example, the time to unconsciousness would be quicker for a method using a target decompression pressure of 26 inHg and a lapse time of 60 seconds, than it would be for a method using a target decompression pressure of 25 inHg and a lapse time of 60 seconds. Likewise, the time to unconsciousness would be quicker for a method using a target decompression pressure of 25 inHg and a lapse time of 55 seconds than it would be for a method using a target decompression pressure of 25 inHg and a lapse time of 60 seconds.

Following loss of consciousness, the birds will experience complete heart fibrillation, i.e., fibrillation of both the atria and ventricles shortly thereafter, indicating that death is imminent. Typically, complete heart fibrillation is achieved about 23 seconds to about 53 seconds after the start of decompression, more typically about 34 seconds to about 36 seconds after the start of decompression, and more typically about 35 seconds after the start of decompression, and 1 to 4 seconds after a 90% or more loss of brain wave activity is achieved. Like discussed above for achieving a 90% or more loss of brain wave activity, it should be understood that the time following the start of decompression that it takes to achieve complete fibrillation may vary depending on the target decompression pressure and/or lapse time.

Following heart fibrillation, the birds will experience ataxia, i.e., loss of posture (LOP). In particular, upon ataxia, the birds are unable to maintain a standing position, and lose all neck tension. During ataxia, the birds exhibit a tonic seizure, with wings extended and the tips of the wings crossed on the distal extremities. Ataxia typically occurs within about 90 seconds or less after the start of decompression, more typically about 20 seconds to about 50 seconds after the start of decompression, more typically about 30 seconds to about 40 seconds after the start of decompression, more typically about 37 seconds to about 39 seconds after the start of decompression, and more typically about 38 seconds after the start of decompression, and 1 to 4 seconds after complete heart fibrillation. Like discussed above for achieving a 90% or more loss of brain wave activity and complete heart fibrillation, it should be understood that the time following the start of decompression that it takes to reach ataxia may vary depending on the target decompression pressure and/or lapse time.

As noted above, the stunning and slaughtering of poultry using the low atmospheric pressure method described herein advantageously is more humane than currently known slaughter techniques, such as electrical stunning followed by exsanguination. For instance, it has been discovered that the blood corticosterone level of birds following slaughter using the methods described herein is not significantly elevated as compared to the blood corticosterone level of the birds prior to slaughter. Additionally, birds slaughtered using the methods described herein have a lower blood corticosterone level following slaughter than do birds slaughtered using an electrical stun/slaughter technique. In particular, corticosterone, which is the principle stress hormone in poultry and is produced in the birds in response to stress and fear, has been found to be present in significantly lower levels in birds slaughtered using the method described herein, as compared to electrically stunned/slaughtered birds. Specifically, it is believed that since the birds are rapidly rendered unconscious during decompression, they are unaware of impending death and thus do not experience fear and pain to the extent of birds slaughtered using electrical stunning techniques, which typically involve shackling the birds and hanging them upside down prior to death.

Preferably, the blood corticosterone level upon removal from the sealed decompression chamber of birds slaughtered using the methods described herein will be not more than about 5% greater than the blood corticosterone level of the birds prior to slaughter. In one particularly preferred embodiment, the blood corticosterone level upon removal from the sealed decompression chamber of birds slaughtered using the methods described herein will be about the same as (i.e., about 0% greater) the blood corticosterone level of the birds prior to slaughter.

Typically, birds slaughtered using the methods described herein will have a blood corticosterone level upon removal from the sealed decompression chamber of from about 565 pg/mL to about 945 pg/mL. In contrast, birds slaughtered using electrical stunning followed by exsanguination will typically have a blood corticosterone level upon bleed out of from about 1336 pg/mL to about 1948 pg/mL. It should be understood that the blood corticosterone levels may vary slightly, depending on the target decompression pressure, lapse time, and hold time utilized. Generally, however, the higher the corticosterone level, the less humane the slaughter technique is.

As noted above, stunning and slaughtering of poultry using the low atmospheric pressure methods described herein advantageously results in birds having excellent meat quality with potential advantages in comparison to birds slaughtered using other methods, such as electrical stunning followed by exsanguination. One of the quality requirements for poultry meat that is important to consumers is tenderness. Tenderness is a characteristic of meat products which is substantially determined by the time after the death of an animal at which the meat is removed from the bones. This time is referred to, in practice, as the post-mortem deboning time. Generally speaking, where post-mortem deboning times are short, i.e., deboning occurs shortly after the death of the slaughtered bird, the meat is typically tough, which is caused by the slaughtered animal going through rigor mortis.

More particularly, shortly after the death of an animal, a certain amount of energy is still present (stored) in its muscles. If a muscle is cut away from the skeleton before rigor mortis has set in, then the muscle will severely contract under the influence of this residual energy still present in the muscle and the muscle will stiffen. As a result of this muscle stiffening, a piece of meat will have poor tenderness. However, as long as a muscle remains connected to the skeleton of the poultry, it is not possible for the muscle to contract unrestricted.

Thus, in an effort to avoid toughening of the meat, it is common practice in the poultry industry to age the birds' carcasses for 6 to 24 hours in coolers prior to deboning. However, this process is not one hundred percent effective, and storage costs can be expensive. Furthermore, delaying the deboning process can affect other quality factors, such as color of the product, the degree of moisture-binding in the product, and the texture of the surface of the product.

The low atmospheric pressure slaughter method described herein advantageously avoids many of these drawbacks. In particular, the low atmospheric pressure slaughter method reduces the amount of oxygen present in the tissues so that the rigor process appears to shorten. Consequently, the necessity of carcass ageing, required for other slaughter methods, may be reduced.

An objective method for measuring tenderness is the measurement of "shear force" or shear value of the meat. The shear value can be measured, for example, with a Warner-Bratzler instrument, in which case a V-shaped tool can be used to measure the force which is necessary to slice through or cut a piece of meat. Generally, meat shear values of greater than 4.6 kg are considered non-tender, as measured by the amount of force that it takes for the Warner-Bratzler shear device to cut through a 1×1×2 cm strip of chicken breast, parallel to the muscle fibers. Advantageously, birds slaughtered using the low atmospheric pressure method of the present disclosure will exhibit meat shear values at 2 hours after deboning below this tenderness standard. Rigorously controlled studies have revealed a numerical difference in tenderness among electrically stunned/slaughtered birds and low atmospheric pressure slaughtered birds, as is illustrated in Example 10 and Table 5. Additionally, in a study performed using an industry size chamber it was discovered that birds slaughtered using the low atmospheric pressure methods described herein will typically have from about 12% to about 25%, more typically from about 24% to about 25% less meat shear value at 2 hours after slaughter than will birds slaughtered by traditional electrical stunning/exsanguination techniques.

Another indication of improved meat product quality is pH, which may be used as a gauge of the onset of rigor. The energy supply present in the muscle upon slaughter is predominantly present in the form of glycogen, which, via intermediate products such as glucose, is ultimately converted into lactic acid in muscle upon death of the bird. As lactic acid builds up, the pH in the muscles will fall, and rigor begins. Additionally, as the pH falls and approaches the isoelectric point, the water-holding capacity of the meat, i.e., the ability of the meat to retain its water, such as during processing, may be affected.

It is thus preferable for the pH of the meat to decrease only to about 5.8 to about 6.2 after slaughter, from an initial pre-slaughter pH of about 7.0. When poultry meat decreases below a pH of about 5.8, the water holding capacity of the meat begins to decrease, and the meat color may become an undesirable pale color. Although a study conducted comparing meat pH at 24 hours post-slaughter in electrically stunned birds and birds stunned using the low atmospheric pressure method described herein found no significant differences in meat pH at 24 hours post-slaughter, birds stunned using low atmospheric pressure methods had a higher percentage of breast meat that was darker than electrically stunned birds, which is a quality improvement. A comparison of pH and color between meat obtained from birds slaughtered using a low atmospheric pressure method described herein and electrical stunning/slaughter is set forth in Example 10.

As noted above, the low atmospheric pressure method described herein reduces the amount of oxygen present in the tissues at the time of slaughter to the point that the rigor process may be shortened. Additionally, as previously discussed, lowering the amount of oxygen present in the tissues and blood of the bird contributes to the rapid loss of consciousness in birds slaughtered using the low atmospheric pressure method.

The presence of oxygen can be measured in terms of partial pressure of oxygen ($pO_2$) in the blood upon slaughter. Preferably, the $pO_2$ for birds slaughtered using the methods disclosed herein will be from about 19 to about 27, and more typically will be about 23, as measured upon removal of the birds from the sealed decompression chamber. In comparison, birds slaughtered using electrical stunning followed by exsanguination will typically have a much higher $pO_2$ level.

Additionally, birds slaughtered using the methods described herein typically have a lower GAP level (ratio of blood cations to anions), lower partial pressure of carbon dioxide ($pCO_2$), and lower level of chloride ion in the blood upon slaughter than birds slaughtered using electrical stunning followed by exsanguination.

The blood GAP level for non-stressed birds is typically about 14. A comparison of the blood GAP levels for birds slaughtered using the methods disclosed herein and birds slaughtered using an electrical stun/slaughter technique was performed as described in Example 6. The results of this comparison indicated that the blood GAP level for birds slaughtered using the low atmospheric pressure method is typically relatively neutral, typically from about −3.0 to about 3.0, and more typically will be about 0.01. In contrast, the blood GAP levels for birds slaughtered using the electrical stun/slaughter methods will typically be about 30.8±3. The elevated GAP levels in electrically stunned/slaughtered birds strongly suggest that the electrical voltage used to perform the slaughter is detectible by the birds, and causes some level of pain and discomfort. Additionally, the significant GAP increase in electrically stunned/slaughtered birds is indicative of a major imbalance in the blood, with anion (e.g., $HCO_3^-$ and $Cl^-$) levels elevated. An imbalance of moisture and electrolyte levels at the cellular level may result in a loss of moisture in the meat, as the meat attempts to reach equilibrium levels. In contrast, the birds slaughtered using the low atmospheric pressure methods described herein contained lower anion levels closer to equilibrium. As a result, meat from birds slaughtered using the low atmospheric pressure methods will retain more moisture and have increased meat tenderness as compared to meat from birds slaughtered using electrical stun/slaughter techniques.

A comparison of the $pCO_2$ levels for birds slaughtered using the methods disclosed herein and birds slaughtered using an electrical stun/slaughter technique was performed as described in Example 6. The results indicated that the $pCO_2$ level, which is a measure of the presence of carbon dioxide in the blood upon slaughter, for birds slaughtered using the methods disclosed herein will be from about 42 to about 48, and more typically will be about 45. In contrast, the $pCO_2$ level for birds slaughtered using electrical stun/slaughter techniques will typically be about 56.4±2.6. The lower $pCO_2$ levels in birds slaughtered using low atmospheric pressure is indicative of lower $HCO_3^-$ levels, which as noted above, may affect meat moisture levels. As a result, meat from birds slaughtered using the low atmospheric pressure methods will retain more moisture and have increased meat tenderness as compared to meat from birds slaughtered using electrical stun/slaughter techniques A comparison of the chloride ion levels in the blood of birds slaughtered using the methods disclosed herein and birds slaughtered using an electrical stun/slaughter technique was performed as described in Example 6. The results indicated that the blood chloride ion level for birds slaughtered using the methods disclosed herein will be from about 125 meq/l to about 131 meq/l, and more typically will be about 128 meq/l. In contrast, the blood chloride ion levels for birds slaughtered using electrical stun/slaughter techniques will be about 148±2.

Chloride ion levels in the blood are a by-product of muscular contraction. Lower levels of chloride ion present in the blood post-slaughter indicate that less contractive activities were occurring prior to death, while higher chloride ion levels indicate that greater contractive activities were occurring prior to death. As such, chloride ion levels in the blood of slaughtered poultry can be used to evaluate the degree of muscular contraction, and thus the degree of struggle, that occurs during slaughter. Additionally, low chloride ion levels in the blood indicate that chloride ions are maintained in the muscle, rather than being released into the blood. The presence of chloride ion in the muscle affects the ability of the muscle to retain water, and reduces the negative effects of rigor on meat quality. As can be seen from the results obtained in Example 6, birds slaughtered using low atmospheric pressure had lower levels of chloride ion in the blood post-slaughter than birds electrically slaughtered, indicating birds slaughtered using low atmospheric pressure did not struggle as much during slaughter, and meat from birds slaughtered using the low atmospheric pressure methods will retain more moisture and have increased meat tenderness as compared to meat from birds slaughtered using electrical stun/slaughter techniques.

A comparison of various physiological parameters of birds slaughtered using low atmospheric pressure and birds slaughtered using electrical stunning followed by exsanguination can be found in Example 6.

The methods of the present disclosure may be adapted for use on any type of poultry including, but not limited to, chickens, turkeys, quail, geese, ducks, ratites, and combinations thereof. In one preferred embodiment, the poultry is chicken.

While the disclosure has been described in terms of various specific embodiments, those skilled in the art will recognize that the disclosure can be practiced with modification within the spirit and scope of the claims.

The present invention is illustrated by the following examples which are merely for the purpose of illustration and are not to be regarded as limiting the scope of the disclosure or manner in which it may be practiced.

EXAMPLES

Test Methods

Decompression chamber: The decompression chamber used in Examples 1 to 4 comprised a cylindrical vessel (LVC1820FP75-VIA, LACO Technologies, Salt Lake City, Utah) having a volume of 83.3 L directly connected to a rotary vacuum pump (DS302, Varian, Inc., Palo Alto, Calif.) with a flow rate of 16.9 $m^3/h$. The vessel was equipped with a translucent acrylic lid for observation. A PC-based data acquisition and control system (USB-1208FS, Measurement Computing Corp., Norton, Mass.) was used to monitor tank pressure and control pump operation. Tank pressure was measured with a strain-gage based pressure transducer (PX-603, Omega Engineering, Inc., Stamford, Conn.), and airflow was controlled with manually actuated ball valves.

The decompression chamber used in Examples 5 to 10 comprised a commercial size chamber measuring 7 feet in diameter and 10 feet in length and having a volume of 400 cubic feet. The chamber was equipped with a gravity roller bed, which allowed for insertion and retrieval of a standard poultry transport cage. The chamber doors were designed and built to facilitate closure and sealing on each end of the chamber. Low atmospheric pressure was achieved by means of a series of vacuum rated butterfly valves employed for vacuum application and release and using three vane type vacuum pumps (Becker, Model U4.630, Becker Pump Corp., Cuyahoga Falls, Ohio). Each vacuum pump rated at 400 cubic feet per minute.

Pressures: Unless otherwise indicated, pressure levels given in the following examples are in absolute pressure (in kPa), with the corresponding gauge pressure in inHg given in parentheses.

Example 1

Pressure Level

In this example, the effect of subjecting chickens to varying pressure levels was determined. To begin, 48 commercial broilers at 63 days of age were divided into six groups. Birds from each group were individually subjected to pressure levels of either 70.9 kPa (8.9 inHg gauge), 60.8 kPa (11.89 inHg gauge), 50.7 kPa (14.89 inHg gauge), 40.5 kPa (17.92 inHg gauge), 30.4 kPa (20.91 inHg gauge), or 20.3 kPa (23.9 inHg gauge), using the decompression chamber described in the Test Methods section, over a lapse time of 37 seconds. Once the target pressure was obtained, the pressure was maintained for two minutes, and the occurrence of ataxia was observed. Ataxia was determined to have occurred if the birds suffered a loss of posture (LOP), resulting in the inability to maintain a standing position and no neck tension, at the tested pressure level.

For birds subjected to pressure levels of 70.9 kPa (8.9 inHg gauge), 60.8 kPa (11.89 inHg gauge), 50.7 kPa (14.89 inHg gauge), and 40.5 kPa (17.92 inHg gauge), ataxia was not observed. For birds subjected to pressure levels of 30.4 kPa (20.91 inHg gauge) or 20.3 kPa (23.9 inHg gauge), loss of posture was observed in all birds tested. There was a 100% mortality rate for birds subjected to the 20.3 kPa (23.9 inHg gauge) pressure level, a 62.5% mortality rate for birds subjected to the 30.4 kPa (20.91 inHg gauge) pressure level, and a 0% mortality rate for birds subjected to the 40.5 kPa (17.92 inHg gauge), 50.7 kPa (14.89 inHg gauge), 60.8 kPa (11.89 inHg gauge), and 70.9 kPa (8.9 inHg gauge) pressure levels.

Example 2

Time to Loss of Posture

In this example, the time to loss of posture (LOP) for birds subjected to varying pressure levels was determined. 56 commercial broilers at 63 days of age were divided into seven groups, with 8 birds per group. Birds from each group were individually subjected to pressure levels ranging from 20.30 kPa (23.9 inHg gauge) to 35.52 kPa (19.37 inHg gauge) using the decompression chamber described in the Test Methods section, and a lapse time of 37 seconds. Once the test pressure was obtained, the pressure was maintained for 2 minutes, and the time it took for the birds to experience a loss of posture was determined. The results are given in Table 1 below.

TABLE 1*

| Absolute pressure in kPa (inHg gauge) | LOP (%) | Time to LOP (seconds) | Mortality (%) | Time to Death (seconds) |
|---|---|---|---|---|
| 20.30 (23.9) | 100 | 34.5 ± 0.7$^a$ | 100 | 79.1 ± 1.6$^d$ |
| 22.80 (23.16) | 100 | 34.9 ± 1.0$^a$ | 100 | 85.5 ± 1.5$^d$ |
| 25.30 (22.42) | 100 | 34.1 ± 1.3$^a$ | 100 | 83.4 ± 3.8$^d$ |
| 27.90 (21.29) | 100 | 34.6 ± 1.6$^a$ | 100 | 128.4 ± 8.3$^e$ |
| 30.40 (20.91) | 100 | 38.1 ± 2.3$^{ab}$ | 62.5 | 142.8 ± 8.7$^e$ |
| 32.92 (20.17) | 75 | 48.5 ± 4.7$^c$ | 12.5 | — |
| 35.52 (19.37) | 75 | 50.0 ± 6.4$^{bc}$ | 12.5 | — |

*The results set forth in Table 1 are the mean values for each pressure group ± the standard error of the mean.
— Time to death was not determined for these pressure settings due to the low incidence of mortality.
$^{a-e}$Means with no common superscripts differ significantly (p < 0.05).

As can be seen from these results, the time to LOP for the lowest four pressures was very similar, ranging from 34.1 to 34.9 seconds. The time to death increased with increasing atmospheric pressure and ranged from 79.1 to 142.8 seconds.

The survival data from this experiment was fitted to the following equation, and non-linear regression analysis was used to determine the dose response relationship between atmospheric pressure and bird response:

$$Y = a/[1+(x/x_0)^b]$$

where:
Y=probability of survival
a=asymptotic maximum probability
x=slope of transition (1/kPa)
$x_0$=midpoint of transition (kPa)

The equation resulted in the following coefficients: a=93.3672 (p≦0.0001), b=21.1147 (p≦0.0117), and $x_0$=29.8918 (p≦0.0001), with a standard error of 4.2. Using the equation, the pressure resulting in 99% mortality was determined to be a maximum of 24.1 kPa (22.77 inHg gauge). The average time to loss of posture for the lowest four pressures (i.e., 34.5 sec) was used as a reference point to estimate the pressure at which loss of consciousness occurred, and the average pressure after 34.5 seconds of evacuation was 21.1 kPa (23.67 inHg gauge) with a standard error of 0.8.

Example 3

Humanity of Slaughter

In this example, the brain wave activity of birds slaughtered using low atmospheric pressure was observed.

To begin, electrodes were attached to the skin of 56 broilers so that a Type II electrocardiogram (ECG) based on Einthoven's triangle could be recorded. Additional electrodes were attached to skin overlying the skull at the base of the comb of the bird to record electrical activity of the brain as an electroencephalogram (EEG). The electrodes were connected to a telemeter which sent radio waves to a receiver that was hard wired to a PC-data acquisition system.

The birds were placed one at a time into the decompression chamber described in the Test Methods section, and the pressure was lowered to 21.4 kPa (23.57 inHg gauge) over a lapse time of 37 seconds. The low pressure was maintained for 50 seconds (hold time).

Figure 1A:
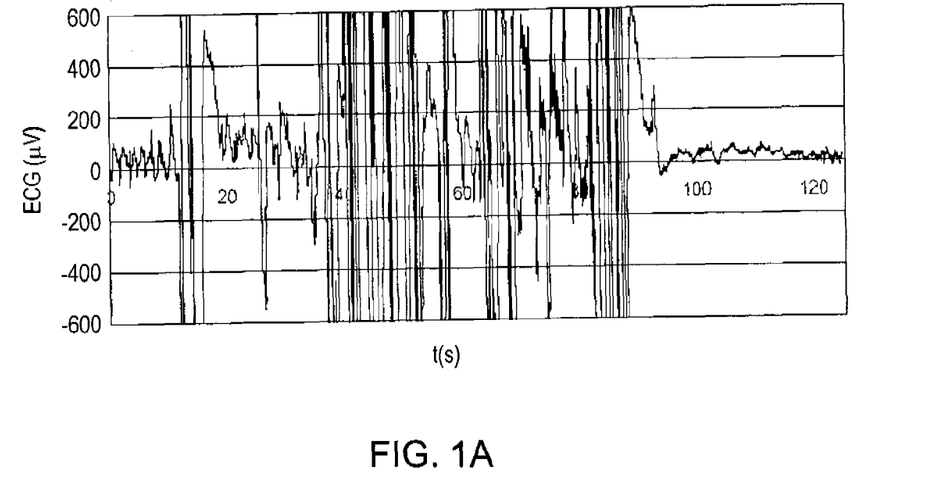
FIG. 1A is a Type II electrocardiogram of a chicken slaughtered using the method described in Example 3.
Figure 1B:
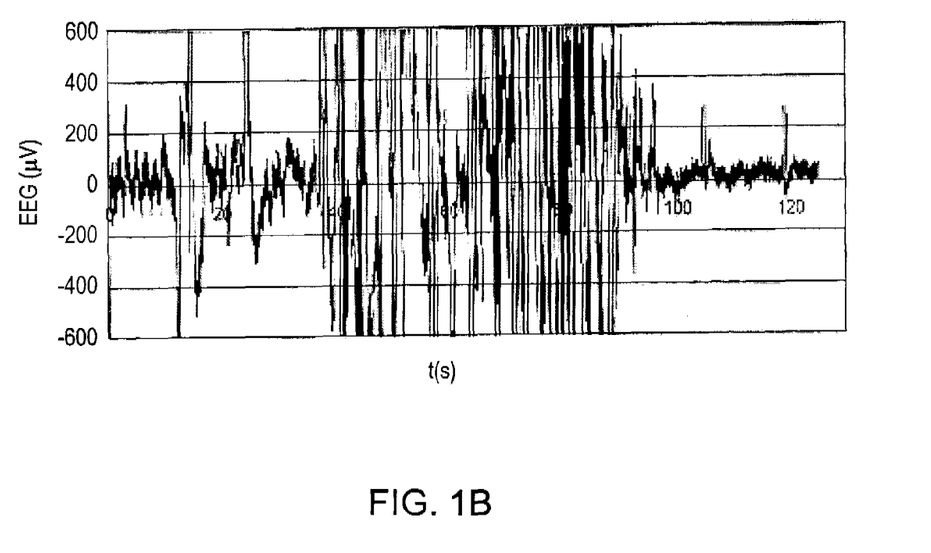
FIG. 1B is an electroencephalogram of a chicken slaughtered using the method described in Example 3.

On average, a 90% reduction in EEG signal occurred within 32 seconds after beginning decompression and reaching a pressure of 21.4 kPa (23.57 inHg gauge). Within 35 seconds the birds' hearts exhibited complete fibrillation of both the atria and ventricles. At 37 seconds after beginning decompression and attaining the 21.4 kPa (23.57 inHg gauge) pressure, loss of posture was recorded. FIGS. 1A and 1B show the ECG and EEG of a chicken being exposed to the 21.4 kPa (23.57 inHg gauge) in a single bird chamber.

Additionally, it was observed that the birds experienced a tonic seizure, with wings extended and tips of the wings crossing on their distal extremities, upon loss of posture. Typically, one to three convulsions occurred, with no sustained convulsions occurring.

As can be seen from these results, the birds experienced a 90% reduction in brain wave activity prior to fibrillation and loss of posture, indicating that the birds were unconscious at the time of fibrillation and loss of posture, and unaware of impending death.

Example 4

Cause of Death

In this example, the cause of death of birds subjected to low atmospheric pressure slaughter was determined. Tissue samples from the slaughtered birds from Example 3 were collected from the cerebrum, cerebellum, thymus, Pectoralis major, Biceps femoris, pancreas, wall of the duodenum, wall of the colon, spleen, testis, ovary, bursa of Fabricius, heart (myocardium of left ventricle), liver, and the right and left lungs. As each tissue was collected, it was placed in 10% neutral buffered formalin and delivered to the histopathology laboratory at the Mississippi State University College of Veterinary Medicine. Paraffin sections were stained and evaluated microscopically by a Board Certified Avian Histopathologist. The pathology report indicated that the cause of death for each bird killed by the low atmospheric pressure, as described in Example 3, was due to simultaneous crushing of both lungs.

Example 5

Corticosterone Level

The level of corticosterone, the stress hormone in birds, was evaluated for chickens slaughtered using low atmospheric pressure, and for chickens slaughtered using electrical stunning followed by exsanguination.

To begin, a blood sample was taken from 300 commercial broilers aged 54 days prior to slaughter. The birds were divided into two groups. 150 birds were slaughtered using electrical stunning followed by exsanguination, using the method as described in Thaxton, J. P., et al., "Corticosterone in commercial broilers," *J. Appl. Poult. Res.*, 2005, Vol. 14, pp. 745-749, and a second blood sample was taken during exsanguination. The second group of 150 birds was slaughtered using the low atmospheric pressure method. In particular, the birds were individually placed into the decompression chamber described in the Test Methods section, and the pressure was lowered to 16.599 kPa (25 inHg gauge) over 60 to 65 seconds (lapse time), and the low pressure was maintained for 30 seconds (hold time). A blood sample was taken from the birds immediately upon removal of the birds from the decompression chamber.

The blood samples from each group were evaluated for the presence of corticosterone using an enzyme linked immunosorbance assay (ELISA). The mean±SEM (standard error of the mean) circulating corticosterone levels in the birds killed using the low pressure method was determined to be 755±190 pg/mL, while the level in the electrically stunned/slaughtered birds was 1642±306 pg/mL.

As can be seen from these results, birds slaughtered using the electrical stunning method had much higher corticosterone levels than did birds slaughtered using the low pressure method. These results clearly indicate that the low pressure slaughter of broilers is a more humane method of killing broilers than is electrical stunning followed by bleed-out.

Example 6

Physiological Parameters

In this example, various physiological parameters of birds slaughtered using low atmospheric pressure were compared to physiological parameters of birds slaughtered using electrical stunning followed by exsanguination.

The post-slaughter blood samples taken in Example 5 for birds slaughtered using low atmospheric pressure and for birds slaughtered by electrical stunning followed by exsanguination were evaluated using an ABL blood gas analyzer (available from Radiometer A/S) to determine plasma sodium ($Na^+$) and GAP levels (ratio of blood cations to anions), partial pressure of carbon dioxide ($pCO_2$), partial pressure of oxygen ($pO_2$), chloride ion ($Cl^-$) levels, bicarbonate ion levels ($HCO_3^-$), calcium levels ($Ca^{++}$), potassium levels ($K^+$), hematocrit (Hct) levels, blood hemoglobin (Hgb) levels, and pH. The results are shown in Table 2 below.

TABLE 2

| Parameter | Low Atmospheric Slaughter | Electrical Stunning Slaughter |
|---|---|---|
| $pCO_2$ | 45.3 ± 2.7 | 56.4 ± 2.6* |
| $pO_2$ | 23.1 ± 3.7 | 78.6 ± 3.5* |
| $HCO_3^-$ (meq/l) | 20.5 ± 0.6 | 24.9 ± 0.6 |
| $Na^+$ (meq/l) | 140 ± 1* | 134 ± 1 |
| $K^+$ (meq/l) | 5.6 ± 0.1 | 5.6 ± 0.1 |
| $Ca^{++}$ (meq/l) | 2.6 ± 0.04 | 2.6 ± 0.04 |
| $Cl^-$ (meq/l) | 128 ± 3 | 148 ± 2* |
| GAP | 0.01 ± 3.1 | 30.8 ± 3* |
| Hct (%) | 22.1 ± 0.7 | 20.5 ± 0.7 |
| Hgb (g/dL) | 7.05 ± 0.22 | 6.54 ± 0.22 |
| pH | 7.31 ± 0.02 | 7.27 ± 0.02 |

*Mean ± SEM differs $P \leq 0.05$ from the corresponding mean.

As can be seen from these results, plasma sodium was elevated for low atmospheric pressure slaughtered birds as compared to electrical stun/slaughtered birds, while GAP, partial pressure of $CO_2$, partial pressure of $O_2$, and chloride ion were reduced in low pressure slaughtered birds as compared to electrically stunned/slaughtered birds. The remaining parameters were not statistically different in the low pressure slaughtered birds and the electrical stunning slaughtered birds.

Example 7

Humanity of Slaughter

In this example, the extent of bird struggle during low atmospheric pressure slaughter and electrical stunning slaughter was evaluated by determining the incidence of broken wings during slaughter.

To begin, broilers at 52 or 59 days of age were killed by either electrical stunning followed by exsanguinations (800 birds), as described in Example 5, or by low atmospheric pressure slaughter (800 birds). In particular, 200 of the birds killed using low atmospheric pressure slaughter were placed into 10 cages, with 20 birds per cage, and 600 of the birds were placed into two cages holding 300 birds per cage. The cages containing the birds were individually placed into the decompression chamber described in the Test Methods section, and the pressure was lowered to 16.599 kPa (25 inHg gauge) over 67 seconds (lapse time), and the low pressure was maintained for 30 seconds (hold time). Following slaughter, the birds in each group were evaluated for incidence of broken wings. The incidence of broken wings for electrically stunned birds was determined to be 0.14%, and for birds slaughtered using low atmospheric pressure was 0.12%. The incidence of broken wings for the low atmospheric pressure stunned/slaughtered birds was insignificant, since the wings were damaged after death, and therefore not an indication of humanity of slaughter.

Example 8

Bird Behavior During Slaughter

The behavior of birds during slaughter can be used to evaluate the quality of the stun and slaughter processes. In this example, the behavior of birds slaughtered using low atmospheric pressure was evaluated.

A closed circuit video camera (Observer Model VC-74-D, Obserview, LLD., Taipei, Taiwan) was mounted inside of a decompression chamber as described in the Test Methods section, and focused on a pen housing 18 broilers that had been loaded into a standard live-haul cage. The cage was placed in the decompression chamber, the camera was activated as decompression was initiated, and the video feed was monitored for the duration of the treatment. Birds were subjected to one of eight different treatments, with 18 birds per treatment group, and the birds' behavior during slaughter was observed.

Treatments 1 through 3: Straight-line pressure draw down (i.e., continuous lapse time) from mean sea level pressure to a pressure of 25 inHg gauge over 181 seconds, 95 seconds, and 65 seconds, respectively, followed by a 30 second hold time before equilibrating the chamber to atmospheric conditions.

Treatments 4 through 8: Straight line pressure draw-down from mean sea level pressure to a pressure of 19 inHg gauge, 20 inHg gauge, 19 inHg gauge, 19 inHg gauge, or 22 inHg gauge, respectively, over a period of varying lapse times, followed by a hold time of either 0 seconds (Treatments 4-5), 15 seconds (Treatments 6 and 8), or 30 seconds (Treatment 7), then a second pressure draw-down to 25 in Hg followed by another 30 second hold time before equilibrating the chamber to atmospheric conditions.

The least amount of bird activity observed during pressure draw-down and the subsequent holding periods occurred during Treatment 3, indicating that Treatment 3 resulted in the most humane death. For Treatment 3, on average, only 2 birds exhibited wing flapping as a part of the death process; the other birds simply lay down and died peacefully. The average flapping time for a bird that flapped was 4 to 5 seconds.

A second observation of bird behavior during low atmospheric pressure slaughter at 25 inHg was performed using the eight different treatment groups, with 18 birds per treatment group. The results for each treatment group are given in Table 3.

As can be seen from these results, Treatment 3 resulted in a subjective slaughter score of 1.00, indicating that this treatment was the most humane. Treatments 4-8, which all involved a two-step pressure decrease, all had subjective slaughter scores of over 2.5, with the scores for Treatments 6-8 all being 4.00, indicating that these treatments were the least humane and less humane than Treatment 3.

TABLE 3

| Treatment | Treatment conditions* | Time to 25 inHg | Stand up | LOP | Begin WF | Activity Ceases | Subj. Score[2] | Calc. Score[3] |
|---|---|---|---|---|---|---|---|---|
| 1 | 0-25, 1 pump | 181 | 56 | 58 | 99 | 138 | 3.5 | 532 |
| 2 | 0-25, 2 pumps | 95 | 27 | 48 | 57 | 105 | 2.75 | 332 |
| 3 | 0-25, 3 pumps | 65 | 65 | 20 | 37 | 43 | 1 | 230 |
| 4 | 0-19, 3 pumps; 19-25, 2 pumps | 78 | 33 | 30 | 41 | 78 | 2.52 | 260 |
| 5 | 0-20, 3 pumps; 20-25, 2 pumps | 80 | 33 | 40 | 52 | 79 | 2.51 | 284 |
| 6 | 0-19, 3 pumps; 15 sec hold; 19-25, 3 pumps | 77 | 37 | 45 | 56 | 78 | 4 | 293 |
| 7 | 0-19, 3 pumps; 30 sec hold; 19-25, 3 pumps | 93 | 47 | 47 | 76 | 97 | 4 | 360 |
| 8 | 0-22, 3 pumps; 15 sec hold; 22-25, 3 pumps | 81 | 40 | 40 | 48 | 80 | 4 | 289 |

[1]Time to 25 inHg = time (seconds) required to decompress to 25 inHg; Stand Up = time (seconds) when the first bird stands up or shows irritation as decompression proceeds; LOP = time (seconds) when loss of posture first occurs; Begin WF = time (seconds) when generalized wing flapping begins; Activity Ceases = time (seconds) when all movement ceases, indicating death.
[2]Subj. Score = subjective behavioral scoring based on the following scheme with 1 being the most humane and 4 being the least humane: 1 = less than 40% of birds exhibit wing flapping and total flapping time is 10 seconds or less and no vocalizations occur; 2 = at least 50% of birds exhibit wing flapping, the duration of flapping is 10 seconds or less, and no vocalizations occur; 3 = seventy percent of birds exhibit wing flapping, the duration of flapping is between 15 and 30 seconds with intermittent periods of cessation of flapping followed by additional flapping, and vocalizations occur; and 4 = all birds exhibit violent wing flapping and prolonged seizures and extreme vocalizations occur.
[3]Calc. Score = score calculated as time to 25 inHg + stand up + LOP + Begin WF + activity ceases.
*"Pump" refers to the number of equally sized pumps used to lower the pressure in the decompression chamber to the indicated pressure.

General observations of slaughter under the various treatment conditions were as follows. At the onset of decompression, most birds were in the sitting position. Some birds would stand as soon as air started exiting the chamber. Within a few seconds, some birds would exhibit one or two head shakes, defecate, raise their contour feathers; all birds became ataxic, and then lost postural balance and became recumbent on the floor of the cage, either lying on their sides or backs. At this stage, flapping of the wings began by some birds accompanied by a low, guttural moaning in all treatments, except Treatment 3. It should be noted that the moaning was not considered a vocalization for purposes of determining the subjective slaughter score.

Example 9

Processing Yields

In this example, differences in processing yields of birds slaughtered using low atmospheric pressure and birds slaughtered using electrical stunning followed by exsanguination were compared.

52 to 59 days old broilers were slaughtered using either low atmospheric pressure, as described in Example 7, or by electrical stunning followed by exsanguination, as described in Thaxton, J. P., et al., "Corticosterone in Commercial Broilers," *J. Appl. Poult. Res.*, 2005, Vol. 14, pp. 745-749, and average processing yields for each slaughter method was determined. Each group contained 75 male and 75 female birds. The results are set forth in Table 4.

TABLE 4

| Parameter | Low Atmospheric Slaughter | Electrical Stun/Slaughter |
|---|---|---|
| Body Weight (lb) | | |
| Male | 8.287 | 8.288 |
| Female | 6.600 | 6.562 |
| Average M/F* | 7.443 | 7.242 |
| White Meat Yield (%) | | |
| Males | 22.210 | 22.240 |
| Females | 22.390 | 22.270 |
| Average M/F* | 22.300 | 22.250 |
| Male Yield (%) | | |
| Front half | 44.910 | 45.870 |
| Wings | 8.340 | 8.370 |
| Skin | 2.830 | 2.990 |
| Breast | 18.410 | 18.510 |
| Tenders | 3.800 | 3.730 |
| Female Yield (%) | | |
| Front half | 46.230 | 47.080 |
| Wings | 8.220 | 8.440 |
| Skin | 3.530 | 3.600 |
| Breast | 18.270 | 18.200 |
| Tenders | 4.120 | 4.070 |

*Average M/F is the average value for all broilers tested, including male and female birds.

As can be seen from these results, the average body weight and yield % for birds killed using low atmospheric pressure slaughter is comparable to the values obtained for birds killed using electrical stun/slaughter techniques. As such, low atmospheric pressure slaughter does not adversely affect these processing parameters.

Example 10

Meat Quality

In this example, the quality of meat obtained from birds slaughtered using low atmospheric pressure was compared to the quality of meat obtained from birds slaughtered using electrical stunning techniques.

Three hundred 52 to 59 days old broilers were slaughtered using either low atmospheric pressure (150 birds), as described in Example 7, or by electrical stunning followed by exsanguination (150 birds), as described in Thaxton, J. P., et al., "Corticosterone in Commercial Broilers," *J. Appl. Poult. Res.*, 2005, Vol. 14, pp. 745-749. The meat quality of the birds slaughtered using each technique was determined using a Warner-Bratzler Chromameter. Color measurements were determined by placing a chromameter on three identical locations on each breast. The results for each group were averaged and are set forth in Table 5.

TABLE 5

| Measurement | Low Atmospheric Slaughter | Electrical Stun/Slaughter |
|---|---|---|
| pH at 15 minutes | 6.03$^b$ | 6.48$^a$ |
| % pH at 15 min <6.0 | 51 | 0 |
| pH at 24 hours | 5.87$^b$ | 5.79$^a$ |

TABLE 5-continued

| Measurement | Low Atmospheric Slaughter | Electrical Stun/Slaughter |
|---|---|---|
| Color bone side$^2$ | | |
| Lightness (CIE L*) | 56.5$^a$ | 58.2$^b$ |
| Redness (CIE a*) | 1.87$^a$ | 1.19$^b$ |
| Yellowness (CIE b*) | 9.3$^a$ | 9.94$^a$ |
| Color skin side$^2$ | | |
| Lightness (CIE L*) | 58.6$^a$ | 60.2$^a$ |
| Redness (CIE a*) | 1.06$^a$ | 0.47$^a$ |
| Yellowness (CIE b*) | 7.1$^a$ | 8.64$^a$ |
| Cooking Loss (%) | 24.9$^a$ | 25.3$^a$ |
| Shear value | | |
| 45 minute debone | 3.90 kg | 4.04 kg |
| 2 hour debone | 3.04 kg | 4.04 kg |
| 4 hour debone | 2.88 kg | 3.35 kg |
| % shear value > 4.6 kg$^1$ | | |
| 45 minute debone | 27.3 | 30 |
| 2 hour debone | 0 | 36.4 |
| 4 hour debone | 0 | 8.333 |

$^{a,b}$Same superscripts within a row denote no statistical difference (p < 0.05)
$^1$Greater than 4.6 kg has been reported as a non-tender sample in literature, but this measurement is not a clear cutoff for whether a sample is tender or not tender
$^2$CIEL, CIE a, and CIE b are measurements of lightness, redness, and yellowness, respectively. Higher values indicate higher degrees of lightness, redness, and yellowness.
*No difference in pH or color among debone times.

As can be seen from these results, there was a trend for increased tenderness using the low atmospheric pressure slaughter when compared to the electrical stunning technique, especially for meat deboned at 2 hours and 4 hours post-slaughter. However, there was no statistical difference among treatments at the 0.05 level, which is likely due to natural breast variation and small sample size. Additionally, the pH of the meat in the low atmospheric pressure stun/slaughter group was higher at 24 hours post-slaughter than the meat in the electrical stun/slaughter group, suggesting better meat quality.

In view of the above, it will be seen that the several objects of the disclosure are achieved. As various changes could be made in the above-described methods without departing from the scope of the disclosure, it is intended that all matter contained in the above description be interpreted as illustrative and not in a limiting sense.

What is claimed is:

1. A method for humanely stunning and slaughtering poultry, the method comprising:
   enclosing the poultry in a sealed chamber;
   decompressing the chamber at a continuous rate to a decompression pressure, the decompression pressure being lower than a normal atmospheric pressure at which the poultry is accustomed to living; and
   maintaining the decompression pressure until the poultry achieves a state of death,
   wherein about 90% or more of the brain wave activity of the poultry ceases prior to the poultry experiencing complete heart fibrillation.

2. The method of claim 1 wherein the decompression pressure is from about 24 inHg gauge pressure to about 25 inHg gauge pressure as measured at mean sea level.

3. The method of claim 1 wherein the decompression pressure is about 25 inHg gauge pressure.

4. The method of claim 3 wherein the lapse time is about 60 seconds.

5. The method of claim 4 wherein the decompression pressure is maintained for about 30 seconds.

6. The method of claim 5 wherein the poultry experiences ataxia after decompression for from about 30 seconds to about 40 seconds.

7. The method of claim 1 wherein pressure in the chamber is reduced to the decompression pressure over a lapse time of from about 30 seconds to about 120 seconds.

8. The method of claim 1 wherein the decompression pressure is maintained for from about 15 seconds to about 60 seconds.

9. The method of claim 1 wherein the poultry experiences ataxia in about 90 seconds or less after the start of decompression.

10. The method of claim 1 wherein the poultry experiences ataxia after decompression for about 38 seconds.

11. The method of claim 1 wherein 90% or more cessation of brain wave activity is achieved after decompression for from about 20 seconds to about 50 seconds.

12. The method of claim 1 wherein complete heart fibrillation is achieved after decompression for from about 23 seconds to about 53 seconds.

13. The method of claim 1 wherein the poultry is selected from the group consisting of chickens, turkeys, quails, geese, ducks, ratities, and combinations thereof.

14. The method of claim 1 wherein the poultry has a blood corticosterone level after achieving the state of death that is not significantly elevated as compared to a blood corticosterone level of the poultry prior to slaughter.

15. The method of claim 1 wherein the poultry has a blood corticosterone level after achieving the state of death of from about 565 pg/mL to about 945 pg/mL.

16. The method of claim 1 wherein blood from the poultry has a partial pressure of oxygen of from about 19 to about 27 after achieving the state of death.

17. The method of claim 1 wherein the blood from the poultry has a GAP level of from about −3.0 to about 3.0 after achieving the state of death.

18. The method of claim 1 wherein the poultry achieve a state of death within about three minutes or less after being enclosed in the sealed chamber.

19. A method for humanely stunning and slaughtering poultry, the method comprising:
enclosing the poultry in a sealed chamber;
decompressing the chamber at a continuous rate to a decompression pressure of from about 21 inHg gauge pressure to about 27 inHg gauge pressure as measured at mean sea level over a lapse time of from about 30 seconds to about 120 seconds; and
maintaining the decompression pressure for from about 15 seconds to about 60 seconds.

20. The method of claim 19 wherein about 90% or more of the brain wave activity of the poultry ceases prior to the poultry experiencing complete heart fibrillation.

21. The method of claim 19 wherein the poultry experiences ataxia after decompression for from about 20 seconds to about 50 seconds.

22. The method of claim 19 wherein the poultry is selected from the group consisting of chickens, turkeys, quails, geese, ducks, ratities, and combinations thereof.

23. The method of claim 19 wherein the decompression pressure is about 25 inHg, the lapse time is about 60 seconds, and the decompression pressure is maintained for about 30 seconds.

* * * * *